United States Patent [19]

Lewis, Jr.

[11] Patent Number: 4,677,482
[45] Date of Patent: Jun. 30, 1987

[54] DUAL MODE PROGRESSIVE SCAN SYSTEM WITH AUTOMATIC MODE SWITCHING BY IMAGE ANALYSIS

[75] Inventor: Henry G. Lewis, Jr., Hamilton Square, N.J.

[73] Assignee: RCA Corporation, Princeton, N.J.

[21] Appl. No.: 815,449

[22] Filed: Dec. 31, 1985

[51] Int. Cl.⁴ .............................................. H04N 7/01
[52] U.S. Cl. ...................... 358/140; 358/11
[58] Field of Search ................ 358/11, 140, 142, 105

[56] References Cited

U.S. PATENT DOCUMENTS

| 4,090,221 | 5/1978 | Connor | 358/105 |
| 4,303,940 | 12/1981 | Ciciora | 358/142 |
| 4,400,719 | 8/1983 | Powers | 358/21 R |
| 4,415,931 | 11/1983 | Dischert | 358/242 |
| 4,509,071 | 4/1985 | Fujimura et al. | 358/11 |
| 4,568,964 | 2/1986 | Doornhein | 358/11 |
| 4,593,315 | 6/1986 | Willis et al. | 358/140 |

FOREIGN PATENT DOCUMENTS 59-40772  3/1984  Japan .................................... 358/140

OTHER PUBLICATIONS

"Development of a New TV Receiver Digital Television Adaptable to New Media", Sony Corp., Aug. 15, 1983.

Primary Examiner—Howard W. Britton
Assistant Examiner—John K. Peng
Attorney, Agent, or Firm—P. J. Rasmussen; P. M. Emanuel; R. G. Coalter

[57] ABSTRACT

The line rate of a video input signal is doubled for display in progressive scan fashion by dual mode processor which generates added lines for the display by interpolation when displaying normal television pictures and by replication (repeating lines) when displaying characters. The processor mode is automatically controlled by an image analyzer which identifies fields of text by counting "major" transitions of the video input signal occurring within a field and comparing the count with a threshold value. Errors in identification are minimized by a further counter which integrates the field count and a hysteresis detector which controls the processor operating mode in accordance with high and low limits of the integrated field count.

9 Claims, 5 Drawing Figures

DUAL MODE PROGRESSIVE SCAN SYSTEM WITH AUTOMATIC MODE SWITCHING BY IMAGE ANALYSIS

FIELD OF THE INVENTION

This invention relates to television systems of the type including a scan converter for converting interlaced video input signal of a given line-rate into non-interlaced video output signals of double line-rate for display in progressive scan form.

BACKGROUND OF THE INVENTION

"Progressively" scanned television receivers have been proposed wherein the horizontal scan rate is multiplied, i.e., doubled, and each line of video is displayed twice thereby providing a displayed image having reduced visibility of line structure. In one form of a progressively scanned receiver, each line of video is stored in one of two memories. As a first of the memories is being written with the incoming video signal at a standard line rate, the second of the memories is read two-times at twice the standard line rate thereby providing two lines of "speed-up" (time-compressed) video within one standard line interval. The second memory output is applied to a display having a doubled horizontal sweep rate synchronized with read-out of the memory thereby doubling the number of displayed lines of video signal. An example of such a progressively scanned receiver, wherein the added lines of video signal are replicas of the original scan lines, is described in U.S. Pat. No. 4,415,931 entitled TELEVISION DISPLAY WITH DOUBLED HORIZONTAL LINES which issued Nov. 15, 1983 to R. A. Dischert.

In another form of progressive scan system, the "extra" lines for display are obtained by interpolation of adjacent vertical lines of the incoming video signal. This may be done either before or after "speed-up" (i.e., time compressing) of the video signal in the memory. An example of a progressively scanned display system in which the additional scan lines are obtained by interpolation from the original scan lines prior to time compression or video "speed-up" is described by K. H. Powers in U.S. Pat. No. 4,400,719 entitled TELEVISION DISPLAY SYSTEM WITH REDUCED LINE SCAN ARTIFACTS which issued Aug. 23, 1983. An alternative of providing interpolation subsequent to speed-up of the video signal is described by Yasushi Fujimura et al. in U.S. Pat. No. 4,509,071 which issued Apr. 2, 1985.

The choice of whether to repeat or interpolate video lines for display in a progressive scan receiver or monitor may depend on the nature of the image being displayed. It has been suggested as being desirable to employ the line interpolation method in a progressive scan receiver when display images of conventional broadcast television and to employ the line replication (repeating) method for displaying characters. See, for example, the paper "Development Of A New TV Receiver Digital Television Adaptable To New Media" by Sony Corp., Aug. 15, 1983. One problem with a receiver having such a dual mode progressive scan capability is that it places an additional burden on the user to change the processing each time he changes video sources. For example, if the user is watching a movie and changes to a television text service or computer source, then he is also burdened with the task of changing the display processing to obtain the sharpest display of character or graphic symbols.

SUMMARY OF THE INVENTION

The present invention resides in part in recognizing the need to relieve the user of a dual mode progressive scan receiver or monitor of the aforementioned burden. In particular, the invention is directed to meeting the need for automatically controlling the processing mode of a progressive scan display system as a function of the image to be displayed.

A progressive scan system embodying the invention comprises a source for providing an interlaced video input signal of a given line rate representative of an image to be displayed. A progressive scan processor means, coupled to the source, provides a processed video output signal of double the given line rate. The processor means has a first operating mode for doubling the line rate by interpolation of lines of the video input signal and a second operating mode for doubling the line rate by replication of lines of the video input signal. An image analysis means is coupled to the source for analyzing a parameter of the image and is coupled to the processor means for selecting the operating mode in accordance with the analysis of the image. A display means is coupled to the processor means for displaying the processed output signal in progressive scan fashion.

DETAILED DESCRIPTION

Figure 1:
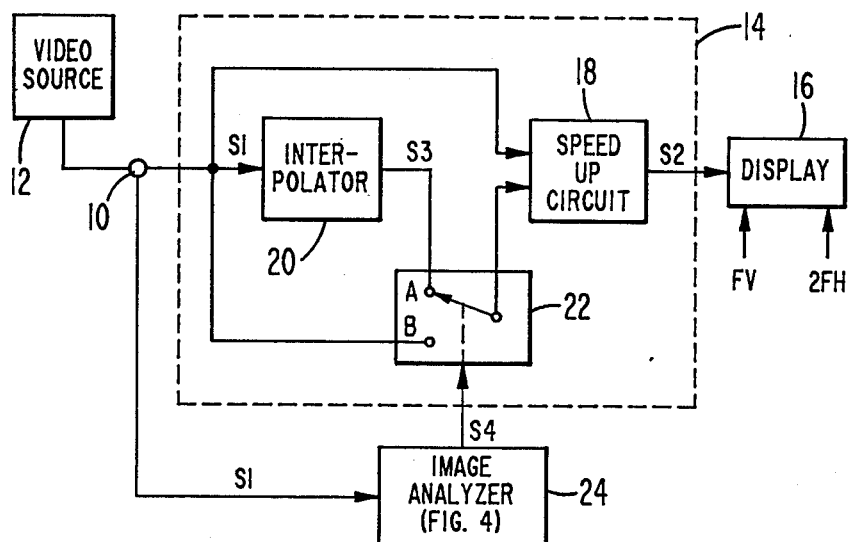
FIGS. 1 and 2 are block diagrams of progressive scan display systems embodying the invention.

The progressive scan system of FIG. 1 includes an input terminal 10 coupled to a video source 12 for receiving an interlaced video input signal S1 representative of an image to be displayed. The image may represent conventional television scenes or it may comprise character or graphic symbols. Source 10 may comprise a tuner, IF amplifier and video detector as found in conventional television receivers and may include television text decoder circuits. Other suitable sources include video cassette recorder, computers, television game accessories, etc.

The interlaced video input signal S1 is applied to a dual mode progressive scan processor 14 (outlined in phantom) which doubles the line rate of signal S1 and supplies the double line rate signal S2 to a display unit 16. In processor 14 video signal S1 is applied to one input of a speed-up unit 18 and to an interpolator 20. A mode control switch 22 is arranged to couple the video input signal S1 or the interpolated (e.g., line averaged) signal S3 to the other input of speed-up unit 18. Switch 22 controls the operating mode of processor 14 in accordance with a mode control signal S4 provided by an image analyzer unit 22 which detects the presence of text or graphic symbols in the image represented by video input signal S1. Powers describes suitable implementations of interpolator 20 and speed-up unit 18 in U.S. Pat. No. 4,400,719 (incorporated herein by reference). Details of a suitable implementation of analyzer unit 22 are shown and described subsequently in connection with FIG. 4.

Figures 3A, 3B, 4:
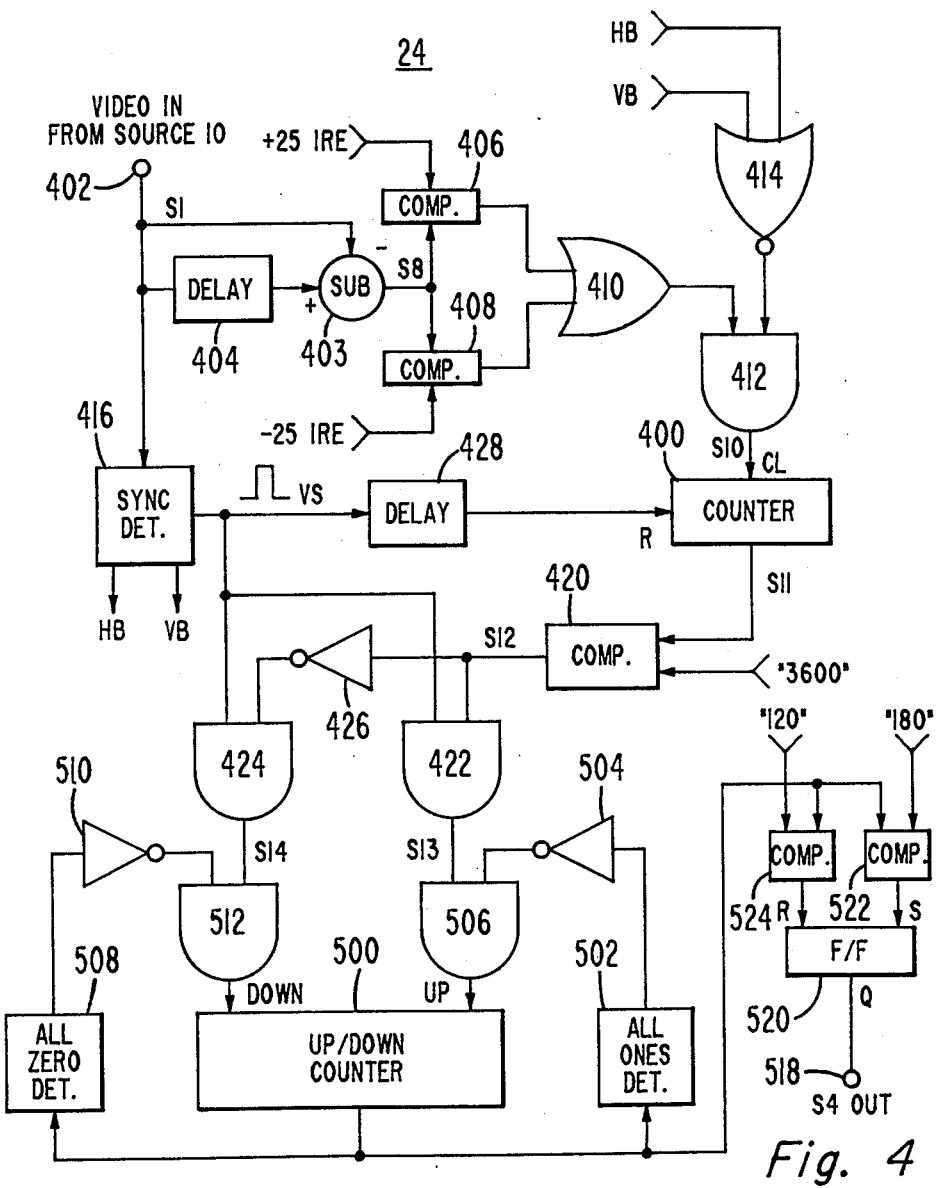
FIGS. 3A and 3B are diagrams illustrating operation of each of the systems of FIGS. 1 and 2.
FIG. 4 is a detailed block diagram of a text detector for use in the systems of FIGS. 1 and 2.

In operation, analyzer 24 measures transitions occurring during the active line interval of video input signal S1 to identify the text or graphic symbol content of the image. Details of the measurement and special provisions for minimizing "false alarms" are discussed subsequently. When signal S1 represents a conventional television scene, analyzer 24 places switch 22 in position "A" (as shown) and speed-up unit 18 time compresses and interleaves the video input signal S1 with the line averaged (interpolated) signal S3. The resultant processed signal (S2) thus appears as shown in FIG. 3A when displayed in progressive scan fashion on display unit 16. As illustrated, the interstitial lines of the display raster are obtained by averaging the preceding and following lines. When signal S1 represents characters (text) or graphic symbols, analyzer 24 places switch 22 in position "B" thus by-passing interpolator 20. In this mode speed-up unit 18 time compresses and repeats signal S1 to provide the raster of FIG. 3B in which the interstitial lines (1', 2', 3') are replicas of the input lines (1, 2, 3). In this mode, processor 14 thus operates as described by Dischert in U.S. Pat. No. 4,415,931 (incorporated herein by reference) in which the line rate is doubled without interpolation by displaying each line twice.

Figure 2:
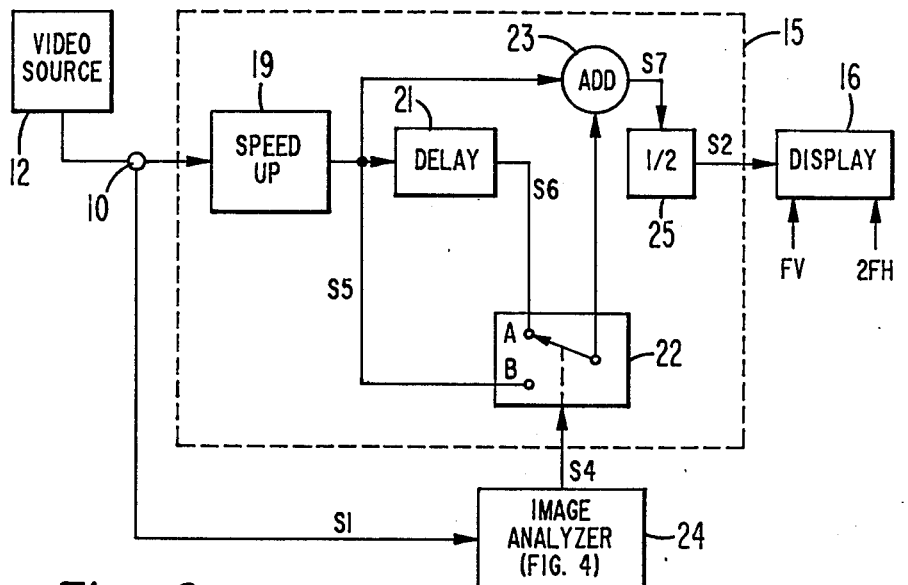

The system of FIG. 2 is similar to that of FIG. 1 but employs a modified version of the progressive scan processor described by Fujimura et al. in U.S. Pat. No. 4,509,071 (incorporated herein by reference). The modification comprises the addition of switch 22 to the processor which, as in FIG. 1, selects line interpolation (FIG. 3A) for normal pictures and line replication (FIG. 3B) for the display of text or graphic symbols. Processor 15 (outlined in phantom) includes a speed-up unit 19 coupled to input 10 for doubling the line rate of signal S1 by time compressing and repeating each input line. For normal (non-text) video scenes, analyzer 24 places switch 22 in position "A" (as shown). In this mode the double line rate and repeated signal S5 is averaged by a 1-H delay unit 21, an adder 23 and an attenuator 25. Since the lines are repeated by speed-up unit 19 before they are averaged (interpolated), the resultant signal S2 is as shown in FIG. 3A in which every other line is interpolated (averaged). As an example, the first line 2 is produced by unit 19 the average is of line 2 and the previous line 1 stored in delay line 21 and thus equals (1+2)/2. The second time line 2 is produced by unit 19 the average is between line 2 (repeated) and the previous line 2 stored in delay line 21 and thus equals line 2. More detailed examples are given by Fujimura et al. When signal S1 represents character or graphic symbols, analyzer 24 places switch 22 in position "B" thereby bypassing delay line 21 and producing the raster of FIG. 3B in which the lines are doubled by repeating each line. This results because in this mode adder 23 doubles the value of signal S5 and attenuator 25 divides the doubled signal (S7) by a factor of 2 and so signal S2 is identical to signal S5.

FIG. 4 illustrates a preferred implementation of image analyzer 24 which, in addition to identifying signal S1 as being representative of text or normal scenes, also includes circuits for minimizing errors or false alarms which, if uncorrected, could cause disturbing visual effects (e.g., flicker) due to erroneous mode switching. As an overview of the principles involved, it has been found that images of characters or graphic symbols have, on the average, nearly twice the number of "major" horizontal transitions in brightness level as images of conventional scenes. A conventional TV picture, for example, may have an average of ten horizontal transitions per line exceeding 25 IRE units in amplitude change in one field whereas an image of characters may have an average twenty or more transitions per line exceeding 25 IRE units in one field. Analyzer 24 of FIG. 4 includes a counter 400 which counts the number of transitions per field of signal S1 to identify fields of text characters. Additional features include circuits for ignoring transitions in blanking intervals (horizontal and vertical) which do not relate to the nature of the image and a further counter 500 for maintaining an average count of text fields to minimize false alarms due to errors in detection of text in individual fields.

In detail, analyzer 24 of FIG. 4 includes an input terminal 402 for receiving the video signal S1 from source 12. Changes in the amplitude of signal S1 in the horizontal direction are sensed by means of a subtractor 402 which subtracts signal S1 from the same signal delayed in delay unit 404 by a short delay (e.g., a one-half pixel delay or about 140 nano-seconds). The difference signal S8 provided by subtractor 402 will be positive if signal S1 increases in amplitude and negative if signal S1 decreases in amplitude. Thus, a change in brightness in either sense of signal S1 will cause an output signal 57 to be produced in proportion to the change occurring in the time interval determined by delay unit 404. For normal pictures there may be many small changes during a given line representing fine detail of a scene. For characters, however, it has been found that the changes will be quite large (e.g., over 25 IRE units in amplitude). It is only the large changes that are useful in identifying text. These large changes are detected by a pair of comparators 406 and 408 which detect transitions of signal S8 exceeding plus 25 IRE units and minus 25 IRE units, respectively. An OR gate 410 combines the outputs of comparators 406 and 408 to provide an output pulse signal S9 which represents transitions of signal S1 which exceed plus or minus 25 IRE units within a 140 nano-second interval.

Transitions of signal S1 that occur during blanking intervals are not useful in identifying text. To avoid undesirable bias in the transition count, signal S9 is applied to transition counter 400 via an AND gate 412 which is inhibited during the horizontal and vertical blanking intervals by means of a NOR gate 414 which receives vertical (VB) and horizontal (HB) blanking signals provided by a synchronizing signal detector 416 coupled to input terminal 10. By this means signal S10 represents only pulses of signal S9 representing "major" transitions of signal S1 occurring during the so-called "active video" portion of signal S1.

It is a further feature of the invention that the major active video transition pulses (signal S10) are counted in counter 400 over a substantial period of time, namely, one full field interval. This full field average improves the reliability of the count by smoothing out short term variations which may occur over a few lines. To prevent overflow of counter 400 it is desirable that the maximum count be substantially in excess of the greatest anticipated count. A count capacity of 14 bits (16,384 in decimal) or more is adequate to prevent overflow where, as in this example, a count of about 2400 is expected for normal scenes and 4800 is expected for text or graphic symbols.

The count (S11) of counter 400 is compared with a threshold value of "3600" by means of comparator 420 which provides an output signal S12 which is HIGH when S11 exceeds 3600 and low when S11 is less than 3600. The threshold value (3600) is selected in being midway between the anticipated value for text (4800) and for non-text images (2400) in one field interval.

A test of signal S12 (HIGH or LOW) is provided by a pair of AND gates 422 and 424. Signal S12 is applied directly to gate 422 and via an inverter 426 to gate 424. Both gates receive vertical sync pulses VS from detector 416. If S12 is HIGH when VS is present gate 422 is enabled and supplies a pulse to the "VP" clock input of up-down counter 500. Conversely, if S12 is LOW when VS is present gate 424 is enabled and supplies a pulse to the "down" clock input of counter 500. Counter 400 is reset by pulse VS (delayed by delay unit 428) after gates 424 and 422 are enabled so as to begin counting the transition pulses of the next field.

Summarizing the foregoing, pulse signal S13 identifies each field having more than 3600 major transitions (over 25 IRE units) of signal S1 and increments counter 500. The count thus advances for fields that are likely to represent text material. Pulse signal S14 identifies each field having fewer than 3600 major transitions of signal S1 and decrements counter 500. The count thus decreases for fields most likely to represent conventional (non-character) images. Counter 500 is an 8-bit counter and includes feedback circuits for preventing overflow and underflow so that the maximum count is limited to 255 (all "ones" in binary) and the minimum count is limited to zero (all zeros in binary). The overflow inhibit circuit comprises an "all ones" detector 502 which produces a HIGH output signal when the count of counter 500 is maximum (255 in decimal). The output of detector 502 is inverted by inverter 504 which disables an AND gate 506 in the S13 signal path when the maximum count is reached. This prevents further increases in the count in response to the VP clock pulses (S13). Underflow of counter 500 is inhibited in a similar manner by means of "all zero" detector 508, inverter 510 and AND gate 512. This underflow and overflow inhibit feature of the invention prevents counter 500 from cycling (i.e., repeating the count sequence) which, if uncorrected, would otherwise lead to cyclic mode switching of processor 14.

Mode control signal S4 at output terminal 518 is produced a flip flop 520 which is SET by a comparator 522 when the count of circuiter 500 exceeds 180 and is RESET by comparator 524 when the count is less than 100. The difference between the comparator reference values (120 and 180) represents the hysteresis zone of detection. As an example, if the count is initially zero, then 180 fields of characters will be detected before flip flop 520 is SET. For NTSC standard signals (60 fields per second) there are thus 3 seconds of integration time before detection. Once flip flop 520 is SET the count would have to decrease from 180 to 120 to change its state. This hysteresis zone (60 fields) between the SET and RESET levels coupled with the field averaging (integration time) provided by counter 500 prevents random switching of the mode control signal when fields are erroneously detected.

What is claimed is:

1. A progressive scan system, comprising:
   a source for providing an interlaced video input signal of a given line rate and representative of an image to be displayed;
   progressive scan processor means coupled to said source for providing a processed video output signal of double said given line rate, said processor means having a first operating mode for doubling said line rate by interpolation of input lines of said video input signal and a second operating mode for doubling said line rate by replication of input lines of said video input signal;
   image analysis means coupled to said source for analyzing a parameter of said image and coupled to said processor means for controlling said operating mode in accordance with said analysis of said parameter; and
   display means coupled to said processor means for displaying said processed video output signal in progressive scan fashion; and wherein:
   said image analysis means being responsive to a frequency of occurrence of brightness changes occurring in a horizontal scan direction of said video input signal for placing said processor means in said first mode when the number of changes per field is below a threshold value and for placing said processor means in said second mode when the number of changes per field is above said threshold.

2. A progressive scan system as recited in claim 1 wherein said image analysis means comprises:
   first means including a counter for providing a count indicative of the total number of changes in amplitude of said video input signal in the horizontal line scan direction which exceed a given level within a field period of time; and
   second means responsive to said count for generating a mode control signal for controlling said operating mode of said processor means.

3. A progressive scan system as recited in claim 2 further comprising means for inhibiting counting of said changes during a blanking interval of said video input signal to minimize a tendency for said count to be biased by transitions a said video input signal occurring in said blanking interval.

4. A progressive scan system, comprising:
   a source for providing an interlaced video input signal of a given line rate and representative of an image to be displayed;
   progressive scan processor means coupled to said source for providing a processed video output signal of double said given line rate, said processor means having a first operating mode for doubling said line rate by interpolation of input lines of said video input signal and a second operating mode for doubling said line rate by replication of input lines of said video input signal;
   first circuit means coupled to said source for providing an identification pulse for each field of said video input signal that contain more than a given number of amplitude changes in a horizontal line scan direction which exceed a given threshold level;
   second circuit means for controlling said operating mode of said processor means as a function of said identification pulses provided by said first circuit means; and
   display means coupled to said processor means for displaying said processed video output signal in progressive scan fashion.

5. A progressive scan system, comprising:
   a source for providing an interlaced video input signal of a given line rate and representative of an image to be displayed;

progressive scan processor means coupled to said source for providing a processed video output signal of double said given line rate, said processor means having a first operating mode for doubling said line rate by interpolation of input lines of said video input signal and a second operating mode for doubling said line rate by replication of input lines of said video input signal;

first means for providing an output pulse for each change in amplitude of said video input signal greater than a threshold value;

second means for providing an identification pulse for each given number of lines of said video input signal in which the number of output pulses of said first means exceeds a threshold value;

third means for counting said identification pulses over a limited range of values;

fourth means for detecting values of the count of said identification pulses that fall within two portions of said limited range of values for generating a mode control signal for controlling the operating mode of said processor means; and display means for displaying said processed video output signal in progressive scan fashion.

6. A progressive scan system, comprising:

a source for providing an interlaced video input signal of a given line rate and representative of an image to be displayed;

progressive scan processor means coupled to said source for providing a processed video output signal of double said given line rate, said processor means having a first operating mode for doubling said line rate by interpolation of input lines of said video input signal and a second operating mode for doubling said line rate by replication of input lines of said video input signal;

first circuit means coupled to said source for providing an identification pulse for each group of lines of said video input signal that contain more than a given number of amplitude changes which exceed a given threshold level;

second circuit means for controlling said operating mode of said processor means as a function of said identification pulses provided by said first circuit means; and display means coupled to said processor means for displaying said processed video output signal in progressive scan fashion; and wherein said second circuit means compries counter means for counting said identification pulses; control means for limiting the count of said counter means to a predetermined range of values; and detector means coupled to said counter means for controlling the operating mode of said processor means as a function of the count of said pulses.

7. A progressive scan system, comprising:

a source for providing an interlaced video imput signal of a given line rate and representative of an image to be displayed;

progressive scan processor means coupled to said source for providing a processed video output signal of double said given line rate, said processor means having a first operating mode for doubling said line rate by interpolation of input lines of said video input signal and a second operating mode for doubling said line rate by replication of input lines of said video input signal;

image analysis means coupled to said source of analyzing a parameter of said image and coupled to said processor means for controlling said operating mode in accordance with said analysis of said parameter; and display means coupled to said processor means for displaying said processed video output signal in progressive scan fashion; and wherein said image analysis means comprises first means for providing a count indicative of the number of changes in amplitude of said video input signal which exceed a given level within a given period of time, and second means responsive to said count for generating a mode control signal for controlling said operating mode of said processor means; and wherein said second means comprises first detector means responsive to said count for providing an identification pulse for each given number of lines of said video input signal for which said count exceeds a threshold value; and third means responsive to said identification pulses for generating said mode control signal.

8. A progressive scan system as recited in claim 7 wherein said third means comprise means for counting said identification pulses and for comparing the pulses counted with a second threshold value for generating said mode control signal.

9. A progressive scan system as recited in claim 8 wherein said means for counting said indentification pulses includes under-flow and over-flow inhibit means for limiting the count to a predetermined range of values.

* * * * *